GEORGE COOPER.
Needles.
No. 4,884. Reissued April 30, 1872.
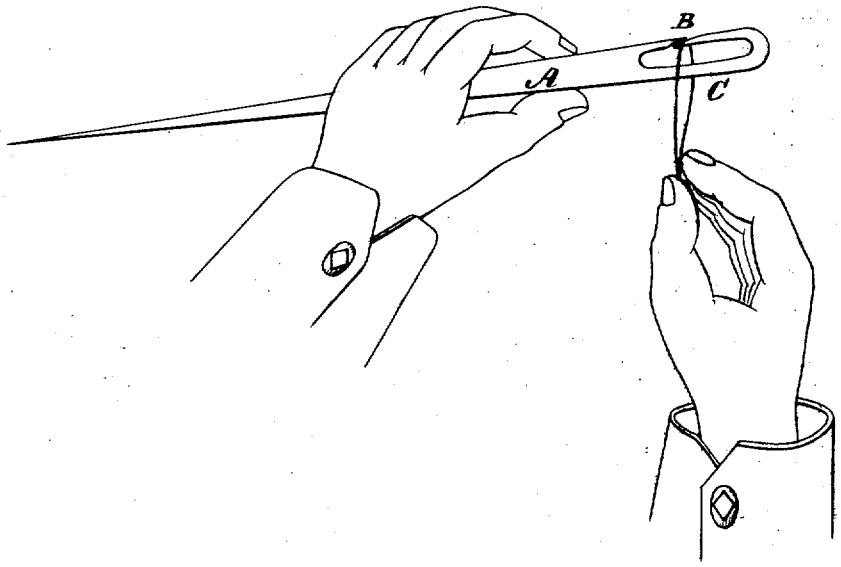
*Witnesses :-*
W. H. Rowe,
Edwd. C. Davidson
*Inventor :-*
George Cooper
by his Atty.
Wm. D. Baldwin

UNITED STATES PATENT OFFICE.

GEORGE COOPER, OF THOMPSONVILLE, CONNECTICUT, ASSIGNOR, BY MESNE ASSIGNMENTS, TO CHARLES W. CLIFFORD.

IMPROVEMENT IN NEEDLES.

Specification forming part of Letters Patent No. 149, dated January 22, 1861; reissue No. 4,884, dated April 30, 1872.

*To all to whom it may concern:*

Be it known that I, GEORGE COOPER, of Thompsonville, county of Hartford, and State of Connecticut, have invented certain new and useful Improvements in Sewing-Needles; and I do hereby declare that the same are described and represented in the following specification and drawing; and to enable others skilled in the art to make and use my improvements I will proceed to describe the construction, referring to the drawing, in which the same letters indicate like parts in each of the figures.

It has long been desired to make what is called a self-threading sewing-needle, or one in which the thread could be introduced into the eye through the adjacent part of the needle, instead of inserting it in the ordinary way by pushing it endwise through the eye.

In the patent granted to Benjamin Garvey, May 12, 1857, there is shown in various forms a needle intended to admit of this self-threading operation; but it is objectionable, and has proved so by experiment, for various reasons, among which may be mentioned lack of strength to resist the thrust of the thimble, a considerable part of the metal being cut away to form a notch, into which the bight of the thread descends on its way to the elastic gate or spring slit, through which it is to be pressed into the eye; and also the fact that the smooth outline of the needle is destroyed by this notch, which catches in the cloth during the act of sewing. The forms of his needle, shown in Garvey's patent, Figs. 3 and 4, are comparatively free from this last objection, but they are especially liable to the former one—namely, want of strength, Fig. 3—because the whole thrust of the thimble is taken against a small extended part of the butt of the needle; and Fig. 4, because the needle is slit or bisected for more than half its length. Again, the weakening of the needle, which necessarily results from making any opening into the eye, requires, in needles for most purposes, to be compensated in some way; and this is not done in Garvey's needle, the eye of which is formed in the middle or axial line of the needle, as in the common sewing-needle. Because of these and other objections, Garvey's needle has never, to my knowledge, gone into practical use.

There is also shown in the patent granted to S. H. Roper, Nov. 4, 1856, a needle in which the longitudinal axis of the eye is on one side of the longitudinal axis of the needle, and an opening is formed through the thin side of the metal to permit the bight of the thread to pass into the eye; but such opening is cut at right angles to the longitudinal axis of the needle, and its edges would interfere with the free passage of the needle through the cloth if uncontrolled.

The nature of my invention consists in certain improvements by which an opening is formed through the metal on one side of the eye to permit the bight of the thread to pass in while the strength of the needle and its general efficiency in use are not impaired.

In the accompanying drawing, A is the needle, and B is the spring or lap-joint.

I will now describe the mode which I prefer for making my improved needle: The part C, shown in the drawing, forming the eye, is drawn out straight; the cap at B, at the head or termination of the body of the needle, is formed into the desired shape by mechanical means, and the end of the part C is turned over and under the lip at B, so that by holding the needle between the thumb and fingers in the ordinary way for threading the needle, and laying the thread over and bringing the parts together between the thumb and finger of the other hand, drawing it down to the lap-joint B, depressing the spring or that portion of the eye under the lap, the thread is admitted into the eye.

It will be obvious that such a needle, having this self-threading capacity, not only admits always of rapid and easy threading, but is especially convenient for the use of those whose sight is impaired.

It will be observed that in the drawing the eye is formed on one side of the center of the needle, or with its longitudinal axis on one side of the longitudinal axis of the needle, thus leaving a preponderance of metal on the side opposite to that in which the opening is provided for the thread to be pressed in. By this construction I gain about as much strength on one side of the eye as I lose by forming the opening on the other; and in practice, owing, as I believe, mainly to this construction, my needles are not liable to break any more than common sewing-needles.

I have described the mode which I prefer of making my improved needle, but it will be obvious that a needle possessing all the peculiar features of construction and operation above described, as giving to my needle its novelty and its value, may be made by any mechanical means or method which may be found most economical and convenient.

I have contemplated making needles with a solid eye, having a slit cut diagonally through the metal on one side of the eye so as to admit the thread into the eye, without any depression at the joint. Such needles would possess some of the advantages herein referred to, but I consider them far less perfect than needles in which the joint is opened to admit the thread and closed again by the elasticity of the parts.

What I claim as my invention, and desire to secure by Letters Patent, is—

1. A sewing-needle having the contour or outline of the common sewing-needle, but with a passage extending diagonally towards the needle point through the metal on one side of the eye to admit the thread into the eye, substantially as described.

2. A sewing-needle having the contour or outline of the common sewing-needle, but formed with a spring lap-joint in the side of the eye to admit a thread past the edge into the eye of the needle, when the spring part of the needle presses by its elasticity up against the under side of the standing part to close and keep closed the eye after the thread has been inserted, substantially as described.

3. A sewing-needle having the longitudinal axis of the eye on one side of the longitudinal axis of the needle, and with a passage extending diagonally through the metal on one side of the eye to admit the thread into the eye, substantially as described.

4. A sewing-needle having the longitudinal axis of the eye on one side of the longitudinal axis of the needle, and with a spring joint in the side of the eye, so that the thread may be inserted by depressing the spring part of the needle, the elasticity of which part causes it to close up the joint after the thread has passed into the eye, substantially as described.

GEORGE COOPER.

Witnesses:
WILLARD BRAGG,
ALEXANDER McCOY.